United States Patent [19]

Hays

[11] Patent Number: 4,680,057

[45] Date of Patent: Jul. 14, 1987

[54] EASILY FLUSHABLE TRANSPARENT, STRONG DIARYLIDE YELLOW PIGMENT COMPOSITIONS

[75] Inventor: Byron G. Hays, Verona, N.J.

[73] Assignee: BASF Corporation, Inmont Division, Clifton, N.J.

[21] Appl. No.: 722,971

[22] Filed: Apr. 12, 1985

[51] Int. Cl.$^4$ ............................................. C09D 11/08
[52] U.S. Cl. ................................. 106/23; 106/288 Q; 106/308 Q; 106/308 F; 106/308 M; 534/561
[58] Field of Search ................. 106/23, 288 Q, 308 Q, 106/308 M, 309, 308 F; 534/583, 561

[56] References Cited

U.S. PATENT DOCUMENTS

| | | | |
|---|---|---|---|
| 2,261,626 | 11/1941 | Lang | 260/193 |
| 3,120,508 | 2/1964 | Braun et al. | 260/161 |
| 3,775,148 | 11/1973 | Bradley | 106/288 |
| 3,776,749 | 12/1973 | McKay et al. | 106/288 |
| 3,991,044 | 11/1976 | Conley | 534/750 |
| 4,341,701 | 7/1982 | Pechey et al. | 260/161 |
| 4,469,515 | 9/1984 | Pechey et al. | 106/23 |
| 4,474,609 | 11/1984 | Ehl et al. | 106/288 |

FOREIGN PATENT DOCUMENTS

| | | |
|---|---|---|
| 1116567 | 6/1968 | United Kingdom . |
| 1356253 | 6/1974 | United Kingdom . |
| 1508576 | 4/1978 | United Kingdom . |
| 1566803 | 5/1980 | United Kingdom . |
| 2108143 | 5/1983 | United Kingdom . |
| 2112797 | 7/1983 | United Kingdom . |

OTHER PUBLICATIONS

"Surface Treatment of Organic Pigments for Printing Ink Applications", by B. G. Hays, American Ink Maker, vol. 62, No. 6 (Jun. 1984), pp. 28–50.

"Pigment Flushing", by T. A. Langstroth, Pigment Handbook, vol. 3, pp. 447–455.

Primary Examiner—Amelia B. Yarbrough
Attorney, Agent, or Firm—Emil Richard Skula

[57] ABSTRACT

Diarylide yellow pigment compositions which are sulfonated with 2,2'disulfobenzidine and/or p-sulfoacetoacetanilide are rendered hydrophobic by treatment with specific quaternary ammonium salts. The pigment compositions are easily flushed into flushed bases. When incorporated into printing inks, the pigments demonstrate improved color strength and transparency.

7 Claims, No Drawings

EASILY FLUSHABLE TRANSPARENT, STRONG DIARYLIDE YELLOW PIGMENT COMPOSITIONS

TECHNICAL FIELD

The field of art to which this invention pertains is organic azo pigments, specifically, diarylide yellow pigment compositions.

BACKGROUND ART

Diarylide yellow pigments are well known organic pigments and are commonly used in various types of printing inks. These pigments generally demonstrate good color strength, good transparency, adequate resistance to thermal degradation, and good light fastness. The diarylide yellow pigments are disazo pigments which are manufactured by tetrazotizing 3,3'-dichlorobenzidine to form the tetrazo salt. This tetrazo salt is then coupled with an acetoacetarylide to form the diarylide pigment. Depending on which acetoacetarylide is coupled into the 3,3'-dichlorobenzidine tetrazo salt, pigments are produced having different pigment characteristics such as color shade, resistance to bleeding in solvents, light fastness, and resistance to heat degradation.

The diarylide yellow pigments commonly used in the art are classified according to the acetoacetarylide coupling agent. AAA diarylide yellow is the reaction product of 3,3'-dichlorobenzidine tetrazotized and coupled into acetoacetanilide (AAA). AAMX diarylide yellow is the reaction product of 3,3'-dichlorobenzidine tetrazotized and coupled into acetoacet-2,4-xylidide (AAMX). AAOA diarylide yellow is the reaction product of 3,3'-dichlorobenzidine tetrazotized and coupled into acetoacet-o-anisidide (AAOA). AAOT diarylide yellow is the reaction product of 3,3'-dichlorobenzidine tetrazotized and coupled into acetoacet-o-toluidide (AAOT). HR diarylide yellow is the reaction product of 3,3'-dichlorobenzidine tetrazotized and coupled with acetoacet-2,5-dimethoxy-4-chloranilide.

Use of a different type of coupling agent, a pyrazolone derivative, gives redder pigments: 3,3'-dichloro benzidine tetrazotized and coupled into 3-methyl-1-phenyl-2-pyrazolin-5-one (PMP) gives PMP diarylide orange.

Redder diarylide pigments are made also by using another benzidine derivative, 3,3'-dimethoxy benzidine. When this is tetrazotized and coupled into AAA, dianisidine orange results; when coupled into PMP, dianisidine red results.

Diarylide yellow pigments are the primary organic yellow pigments produced in the United States. Of the diarylide yellow pigments, AAA diarylide yellow, also known as Pigment Yellow 12, is the primary pigment manufactured and used.

The initial step in the manufacture of diarylide yellow pigments is the tetrazotization of 3,3'-dichlorobenzidine. This is accomplished by reacting the 3,3'-dichlorobenzidine with hydrochloric acid and sodium nitrite to produce the tetrazonium salt, 3,3'-dichlorobenzidine tetrazonium chloride.

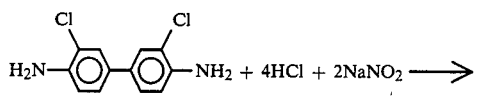

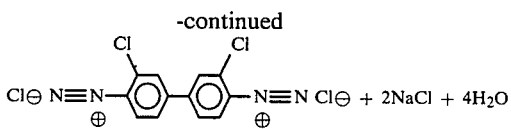

The next step is the coupling of the tetrazonium salt with the acetoacetarylide to form a coupling product; in the case of AAA diarylide yellow, this would be acetoacetanilide. The coupling is typically accomplished by slowly adding the solution of the tetrazonium salt to a slurry of the acetoacetarylide in water. Coupling product is defined as the disazo reaction product of a tetrazo slat and an acetoacetarylide. The resulting reaction product of this coupling is the AAA diarylide yellow pigment.

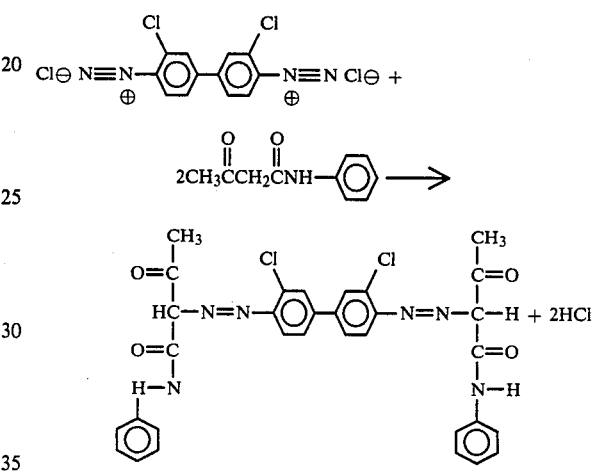

The diarylide yellow pigment (i.e., the coupling product) must be recovered from a water-based pigment slurry when the reaction has been completed. This is typically done by the use of a pressurized filtration device such as a filter press to form a presscake. Typically the presscake comprises about 20% by weight of pigment and 80% by weight of water. Usually, this presscake is dried in an oven, etc., to reduce the water content and dry the pigment. The dried pigment is then dispersed into various types of printing ink vehicles. It is known in the art, however, that the drying of diarylide yellow pigments (that is, the drying of the pigment presscakes to produce a dry pigment) results in a decrease of the color strength and transparency of the pigment. Therefore, it is preferable in the art to form a flushed base by directly incorporating the wet presscake into an oily varnish. The flushed base typically will contain about 30% by weight pigment and about 70% by weight resins and oils. Flushing is typically accomplished by slowly feeding the presscake into a flushing vessel (flusher) containing a slow speed, high shear (e.g., sigma blade) mixer. The flushing process is disclosed in "Pigment Flushing" by T. Langstroth in *Pigment Handbook*, Temple C. Patton, Editor, 1973 (John Wiley & Sons, New York), Vol. III, pp 447–455, which is incorporated by reference. The oil, resins and pigment form one phase, while the water forms a separate phase which is decanted from the flusher. The flushed base remaining in the flusher contains little (e.g., 10%) water and comprises mainly the pigment, the resins, and the oil. The remaining water is removed under vacuum with heating.

There are several advantages associated with flushing the pigment into a resin base and then introducing the flushed base into a printing ink, rather than attempting to manufacture a printing ink by directly dispersing dry pigment into the ink. First of all, the flushing process is a low temperature process, so that the color strength and transparency characteristics of the pigment are not adversely affected as they would be if the pigment were dried; printing inks produced from flushed bases, as compared with printing inks produced from dried diarylide yellow pigment, tend to have increased color strength and transparency. In addition, when dried agglomerated pigments are dispersed in oils or resins, which are the vehicles of many printing inks, dispersing agents must be used on the pigments or in the vehicles in order to get a homogeneous dispersion in a reasonable period of time with minimum energy consumption; these dispersing agents often interfere with lithographic printing properties.

It is known in the art to treat diarylide yellow pigments with various compositions in order to improve the pigment characteristics. A general review of this subject is contained in "Surface Treatment of Organic Pigments for Printing Ink Applications," by B. G. Hays, in "American Ink Maker," Vol. 62, No. 6, (June, 1984), pp.28–50, which is incorporated by reference.

U.S. Pat. Nos. 3,775,148 and 3,776,749 disclose improved diarylide yellow pigment compositions made by adding one or more soluble dyestuffs to the pigment prior to coupling, during coupling, or after coupling. The pigments have improved strength and transparency.

U.S. Pat. Nos. 4,341,701 and 4,469,515 disclose methods of producing improved disazo pigments by a modified coupling technique. The pigments have improved strength and transparency. The process relates to adding a solution or suspension containing 0.1–50% by weight of the theoretically required total weight of one or more coupling components to a diazonium and/or tetrazonium salt of an aromatic or heterocyclic amine; this solution is then added to the other coupling components and the coupling reaction is completed.

U. K. Patent No. GB 2,108,143A discloses agents for enhancing the fluidity of pigment dispersions. The agents comprise a composition of disazo compounds containing a water-insoluble disazo compound in which one of the terminal aromatic groups carries a single substituted ammonium-acid salt group, such as dodecyl trimethyl ammonium or hexadecyl trimethyl ammonium para-sulfo-AAA yellow. Pigments are treated with the agent and nonaqueous pigment dispersions contain the agent.

U.S. Pat. No. 4,474,609 discloses improved mono azo pigment compositions made by adding di-, tri- or tetraquaternary ammonium salts, such as permethylated tallow propylene diamine chloride, to mono azo pigment acid groups. The pigments have improved strength and recrystallization resistance.

It is known in the art to couple diarylide yellow pigments with tetrazotized 2,2'-disulfobenzidine and/or p-sulfo-acetoacetanilide to improve the pigment properties such as strength and transparency. However, the sulfonated AAA diarylide yellow pigments thus produced are very hydrophilic. These hydrophilic sulfonated disazo pigments, while having desirable improved properties, are not easily flushed into oily varnishes. When the flushing of presscakes of these sulfonated diarylide yellow pigments into oily bases is attempted, it is observed that the sulfonated diarylide yellow pigment compositions cannot be easily flushed into oily varnishes: the hydrophilic pigment prefers to remain in the water phase. Although most of the pigment eventually can be flushed into the oily phase, the water phase usually retains some amounts of diarylide yellow pigment which cannot be transferred, even with intense mixing, into the flushed base. Also, the resulting flushed base is usually extremely viscous, even after all water has been removed under vacuum.

Accordingly, this art needs improved sulfonated diarylide yellow pigment compositions which can be easily flushed into oily varnishes to form flushed bases.

DISCLOSURE OF THE INVENTION

Diarylide yellow pigment compositions are disclosed comprising the coupling product of the tetrazo salt of 3,3'-dichlorobenzidine, optionally admixed with 2,2'-disulfobenzidine, and an acetoacetarylide, optionally admixed with p-sulfo-acetoacetanilide, wherein the resulting sulfonated coupling product is treated with at least one of the group consisting of dialkyl, alkylbenzyl, trialkyl methylated, or trialkyl ethylated quaternary ammonium salts, thereby producing diarylide yellow pigment compositions which are easily flushed and have high transparency and high color strength.

Another aspect of this invention is a flushed base comprising a resin and oil vehicle and the previously mentioned diarylide yellow pigment composition.

Another aspect of this invention is an oil-based printing ink comprising an aliphatic oil, a resin and oil vehicle, and the previously mentioned diarylide yellow pigment composition.

The foregoing, and other features and advantages of the present invention, will become more apparent from the following description.

BEST MODE FOR CARRYING OUT THE INVENTION

The compound, 3,3'-dichlorobenzidine (DCB) is a commonly available intermediate for dyes and pigments. It is a grey to purple crystalline solid which is insoluble in water, but soluble in alcohol and ether. An example of commercially available 3,3'-dichlorobenzidine is 3,3'-Dichorobenzidine Dihydrochloride, manufactured by Upjohn Company, North Haven, Connecticut.

The compound 2,2'-disulfobenzidine is a chemical intermediate characterized by being a grey to purple crystalline solid which is essentially insoluble in water, but soluble in dilute sodium hydroxide. An example of commercially available 2,2'-disulfobenzidine is DDD-Acid, manufactured by Mobay Chemical Corporation, Pittsburg, Pa.

Various types of acetoacetarylides can be used to manufacture the diarylide yellow pigments of the present invention. Since AAA diarylide yellow is the most commonly manufactured pigment, the most common coupling compound is acetoacetanilide. Acetoacetanilide is an intermediate in the manufacture of various dry organic dyes, pigments, etc. It is a white crystalline solid which is only slightly soluble in water, but is soluble in dilute sodium hydroxide, alcohol, ether, acids, chloroform, and hot benzene. It is prepared by reacting aniline with diketene. It may also be prepared by reacting ethylacetoacetate with aniline, eliminating ethyl alcohol. Acetoacetanilide is commercially available from several manufacturers, such as American Hoechst, Coventry, R.I. Although various acetoacetarylides can be used to form the disazo pigments of this invention, it is more common to use particular acetoacetarylides such as the previously mentioned acetoacetanilide (AAA), acetoacet-2,4-xylidide (AAMX), acetoacet-o-anisidide (AAOA), acetoacet-o-toluidide (AAOT), and acetoacet-2,5-dimethoxy-4-chloranilide. Additional acetoacetarylides which can be used to form diarylide yellow pigments include acetoacet-p-toluidide (AAPT), acetoacet-p-phenetidide (AAPP), etc.

The compound para-sulfo-acetoacetanilide is manufactured by reacting diketene with sulfanilic acid. The compound is commercially available and is typically purchased as the potassium salt. An example of commercially available p-sulfo-acetacetanilide is acetoacet-sulfanilic acid, potassium salt, manufactured by Lonza Ltd., Basle, Switzerland.

It is critical that the quaternary ammonium salts used in the practice of this invention are selected so that the resulting pigment compositions are rendered hydrophobic. Quaternary ammonium salts are a type of organic nitrogen compound in which the molecular structure comprises mainly a central nitrogen atom joined to four organic groups; this cation is associated with an anion to make the salt. Quaternary ammonium salts are commercially available and are manufactured by reacting tertiary (trialkyl) amines with alkyl halides, dialkyl sulfates, etc. Quaternary ammonium salts are usually cationic surface-active compounds and tend to be adsorbed on surfaces.

In general, most quaternary ammonium salts tend to make substances more readily dispersible in an aqueous medium, i.e., hydrophilic; this property is one of the reasons quaternary ammonium salts are used as surfactants in shampoos, cleaning solutions, etc. However, in the practice of this invention, it is necessary to render the disazo pigment compositions hydrophobic; this enhances the ability of these pigment compositions to be transferred into a flushed base.

It is surprising and unexpected that certain quaternary ammonium salt surfactants will render sulfonated disazo diarylide yellow pigment compositions hydrophobic, thereby permitting these compositions to be readily transferred into an oily varnish or oil to produce a flushed base. The quaternary ammonium salts which can be used in the practice of this invention are those methylated or ethylated quaternary ammonium salts which contain three medium to long chain length alkyl groups, two medium to long chain length alkyl groups, or one medium to long chain length alkyl group and benzyl group; the anion may be chloride, bromide, methylsulfate, etc. The term "medium to long chain alkyl group" as used herein is defined to mean alkyl groups that vary in chain length from about eight carbons (e.g., octyl) to about twenty two carbons (e.g., behenyl). The quaternary ammonium salts which are used to produce the flushible diarylide yellow pigment compositions of this invention include trioctylmethyl ammonium chloride, didecyl dimethyl ammonium chloride, coco (dodecyl-tetradecyl) benzyl dimethyl ammonium chloride, dicoco dimethyl ammonium chloride, disoya or dihydrogenated tallow (hexadecyl-octadecyl) dimethyl ammonium chloride and tallow benzyl dimethyl ammonium chloride. Examples of commercially available quaternary ammonium salts which can be used in the practice of this invention include Henkel Aliquat 336 TM, Lonza Bardac 2250 TM, Rohm and Haas Hyamine 3500 TM and Triton X-400 TM, Jetco JetQuat T-2C-50 TM, Akzo Arquad 2C-75 TM, 2S-75 TM and 2HT-75 TM and Humko Sheffield Kemamine BQ-9742C TM and Q-1902C TM.

As previously mentioned, the diarylide yellow pigment compositions of this invention are preferably incorporated into a flushed base. A flushed base typically comprises about 30% pigment by weight with the remainder being made up of a resin and oil vehicle. The term "resin and oil vehicle" is defined to mean a solution of one or more resins dissolved in one or more oils. The resins and oils used to make flush bases are those known in the art: resins include rosin-modified synthetic resins such as Pentalyn G TM, Picco 6140 TM and Betalite I-640 TM; oils include aliphatic ink oils such as Magie 470 TM and Magiesol 52 TM. Flushed bases may also include optional ingredients such as antioxidants and fatty alcohols.

The flushed bases made with the pigment compositions of this invention are typically incorporated as coloring agents in various types of oil based printing inks known in the art. These inks include various types of heatset and quick setting offset inks and letter press inks. Oil based printing inks typically comprise rosin modified synthetic resins, alkyd resins, aliphatic ink oils, waxes, antioxidants, fatty alcohols, vehicles, binders, pigments, etc.

The diarylide pigment compositions of this invention are manufactured by initially tetrazotizing 3,3'-dichlorobenzidine and, optionally, 2,2'-disulfobenzidine. This is done by charging sufficient amounts of 3,3'-dichlorobenzidine dihydrochloride and, optionally, 2,2'-disulfobenzidine, into a conventional reactor with a mixing means, and then charging sufficient quantities of water, hydrochloric acid, ice and sodium nitrite, and then maintaining the reaction at a sufficient temperature (e.g., 0°–5° C.) for a sufficient amount of time so that the 3,3'-dichlorobenzidine is completely tetrazotized to form 3,3'-dichlorobenzidine tetrazonium chloride, and, optionally, 2,2'-disulfobenzidine tetrazonium chloride. In a separate reactor vessel, sufficient quantities of acetoacetanilide are charged along with water, sodium acetate and acetic acid to form a buffered slurry of acetoacetanilide. Next, if potassium p-sulfo-acetoacetanilide is to be used, sufficient quantities are dissolved in water and added to the acetoacetanilide slurry, either before, during or after coupling. Sufficient quantities of the tetrazotized 3,3'-dichlorobenzidine, optionally tetrazotized 2,2'-disulfobenzidine and p-sulfo-acetoacetanilide solution are charged to the reactor containing the acetoacetanilide slurry, and the coupling reaction is allowed to take place at a sufficient temperature and for a sufficient amount of time until all of the tetrazo salt has been coupled out. Next sufficient amounts of quaternary ammonium salt are added to the reactor vessel to produce sufficient coating of the pigment composition to render it sufficiently hydrophobic. The resulting pigment composition is then filtered through conventional means such as a filter press to form a presscake.

For a conventional AAA diarylide yellow, preferably, to about 253 parts (1.0 mole) of 3,3'-dichlorobenzidine, as its dihydrochloride salt, are added about 1770 parts of water, about 380 parts (3.30 moles) of 31.5% hydrochloric acid, about 880 parts of ice to obtain a temperature of about −5° C., and about 140 parts (2.03 moles) of Sodium Nitrite. The reactants are stirred typically at about −5° C. to about 5° C., preferably about 0° C., for about 45 to about 90 minutes, preferably about 60 minutes, until all 3,3'-dichlorobenzidine tetrazotizes. Excess nitrous acid is destroyed by adding about 3 parts (0.03 mole) of sulfamic acid. This resulting tetrazo solution is then typically added over about 30 to about 90 minutes, preferably about 60 minutes, to a slurry of about 358 parts (2.02 moles) acetoacetanilide, about 380 parts (4.6 moles) sodium acetate, 101 parts (1.35 moles) of 80% acetic acid and about 7300 parts of water, and maintained at a temperature of about 15° C. to about 30° C., preferably about 20° C., until the tetrazo salt is completely coupled out to form the coupling product.

Coupling product is defined as the disazo reaction product of a tetrazo salt and an acetoacetarylide.

When the tetrazo salt of 3,3'-dichlorobenzidine optionally admixed the tetrazo salt of 2,2'-disulfobenzidine, preferably about 6.9 parts (0.02 mole) of 2,2'-disufobenzidine are admixed with each 248 parts (0.98 mole) of 3,3'-dichlorobenzidine; the mixture is tetrazotized as described above.

When p-sulfo-acetoacetanilide is optionally admixed with the acetoacetarylide, preferably about 15 parts (0.05 mole) of potassium p-sulfo-acetoacetanilide are admixed with each 0.95 mole of acetoacetarylide (e.g., 168 parts of acetoacetanilide).

The formation of the coupling product when using the optionally sulfonated components is done by adding the tetrazo solution, optionally admixed with the tetrazo salt of 2,2'-disulfobenzidine, to the acetoacetarylide slurry, optionally admixed with the potassium p-sulfoacetoacetanilide. The reaction conditions are the same as those described above for the conventional AAA diarylide yellow.

The amount of quaternary ammonium salt added to the coupled diarylide yellow pigments of this invention will typically be about 0 to about 50% mole excess, more typically about 0 to about 15%, and preferably about 10%, based on the equivalents of sulfonated intermediate (2,2'-disulfobenzidine and p-sulfoacetoacetanilide) used. The quaternary ammonium salts are added either heat or as solutions in water.

The pigment composition is removed from the aqueous slurry and formed into a filter cake by means conventional in the art such as pumping through a filter press, centrifuging, etc.

The press (filter) cakes of the pigment compositions of this invention will typically contain about 70 to about 85 percent of water, more typically about 75 to about 80 weight percent, and preferably about 80 weight percent.

The flushed bases made using the pigment compositions of this invention are typically manufactured in a flusher vessel comprising a vessel and high torque/slow speed sigma blade mixer. The flusher can be tilted to decant the flushed water. Sufficient quantities of resins and oils are mixed with sufficient quantities of pigment to produce a flushed base having about 20% to about 40% pigment, more typically about 25% to about 35%, and preferably about 30%. The pigment and resins and oils are mixed for a sufficient amount of time to produce a homogeneous pigment dispersion and to remove approximately 90% of the water content of the filter (press) cake. This water is separated by traditional decanting phase separation techniques; the remainder of the water is removed under vacuum.

The flushed bases of this invention are incorporated into printing inks through various dispersing methods known in the art including three-roll milling, shot-milling, and simple mixing. The amount of flushed base incorporated into a printing ink is conventional in the art and is typically about 20 to about 60 weight percent, more typically about 30 to about 50 weight percent, and preferably about 40 weight percent.

The printing inks of this invention are similarly manufactured by mixing and dispersing the ingredients through conventional methods including three-roll milling, shot-milling, simple mixing, etc.

The following examples are illustrative of the principles and practice of this invention although not limited thereto. Parts and percentages used are parts and percentages by weight.

EXAMPLE 1

3,3'-dichlorobenzidine was tetrazotized by charging 700 parts of water, 100 parts of 3,3'-dichlorobenzidine as its di-hydrochloride salt, 150 parts of 31.5% hydrochloric acid, 350 parts ice and 55.5 parts of sodium nitrite to a conventional reactor vessel with an agitator. The reactants were maintained at a temperature of about 0° C. for about 60 minutes until all of the 3,3'-dichlorobenzidine was converted into the tetrazo salt. The excess nitrous acid was then destroyed with about one part of sulfamic acid. The tetrazo solution was held for coupling. To another reactor vessel were charged 2900 parts water, 11.8 parts (5 mole percent) of potassium p-sulfo-acetoacetanilide, 123.5 parts (95 mole percent) of acetoacetanilide, 150 parts sodium acetate and 40 parts 80% acetic acid. The tetrazo solution was added to the coupling component slurry at 20° C. over a one hour period; the reactants were maintained at a temperature of about 20° C. for an additional 60 minutes until the 3,3'-dichlorobenzidine tetrazo salt was completely coupled out.

Aliquots of this slurry were treated with a slight (10 mole percent, based on the amount of p-sulfoacetoacetanilide present) excess of various commercial quaternary ammonium chloride or alkyl amine/acetic acid solutions, such as Ethyl TBMAC ™, Akzo Arquad 12-50 ™, Arquad 18-50 ™, Armeen 2C ™, and Armeen M2C ™. The slurries were then filtered and washed; the resulting presscakes were bench-flushed on a weighed metal plate with an equal weight of an hydrocarbon resin/phenolic resin/fatty acid/oil varnish such as Betalite I-150 ™/Bakelite CK0036 ™/Unitol DT40 ™/Magie 535 ™. This flushing was done by mixing the presscake and varnish with a spatula. The time for water to first break out and the weight of water flushed out after 5 minutes of mixing were noted. The untreated control pigment composition required 5 minutes mixing for first water breakout.

TABLE

| | Water Flushed Out In Bench Flushes | |
|---|---|---|
| Quaternary Ammonium Ion | Mixing Time Before First Appearance of Water (Minutes) | Percent Water Flushed Out In 5 Minutes Mixing |
| None | 5 | 40 (in 10 min) |
| Tri Butyl Methyl | 6 | 45 (in 10 min) |
| Octyl Benzyl Dimethyl | 5 | 0 |
| Di Octyl Di Methyl | 1.5 | 17 |
| Tri Octyl Methyl | 0.5 | 30 |
| Di Decyl Di Methyl | 1 | 35 |
| Dodecyl Trimethyl | 5 | 0 |
| Coco Trimethyl | 2 | 10 |
| Coco Benzyl Dimethyl | 1 | 30 |
| Dicoco Dimethyl | 0.8 | 35 |
| Hexadecyl Trimethyl | 5 | 0 |
| Tallow Trimethyl | 5 | 0 |

TABLE-continued

| | Water Flushed Out In Bench Flushes | |
|---|---|---|
| Quaternary Ammonium Ion | Mixing Time Before First Appearance of Water (Minutes) | Percent Water Flushed Out In 5 Minutes Mixing |
| Di Soya Dimethyl | 0.8 | 35 |
| Di H Tallow Dimethyl | 0.3 | 40 |
| Tallow Trimethyl/Dicoco-Dimethyl (1:1) | 0.5 | 47 |
| Octadecyl Benzyl Dimethyl | 0.8 | 35 |
| Permethylated Tallow Propylene Diamine | 3 | 12 |
| Dodecyl Pyridinium | 0.8 | 17 |
| Hexadecyl Pyridinium | 1 | 25 |
| Dicoco Amine/Acetic Acid | 1 | 12 |
| Dicoco Methyl Amine/Acetic Acid | 0.8 | 17 |

Most of the quaternary ammonium chlorides (e.g., tributylmethyl, dioctyldimethyl, octylbenzyldimethyl, dodecyl trimethyl, cocotrimethyl, hexadecyl trimethyl, tallow trimethyl and octadecyltrimethyl, and a diquaternary ammonium chloride (permethylated tallow propylene diamine chloride)), two alkyl pyridinium chlorides (dodecyl and hexadecyl) and two amines (dicoco and dicocomethyl) gave either long times for water to break out and/or very little water flushed out. However, certain trialkylmethyl, dialkyl dimethyl and alkyl benzyldimethyl quaternary ammonium chlorides (e.g., trioctylmethyl, didecyldimethyl, coco (dodecyl/tetradecyl) benzyldimethyl, dicocodimethyl, octadecyl benzyl dimethyl, and disoya or dihydrogenated tallow (hexadecyl/octadecyl) dimethyl) gave short breakout times (30-60 seconds) and flushed out 30-35% of the water present.

EXAMPLE 2

The coupling procedure of Example 1 was followed, except that the solution of 5 mole percent potassium p-sulfo-acetoacetanilide was added at different points: before (as in Example 1), during and after coupling the acetoacetanilide. For adding the p-sulfo-acetoacetanilide solution during coupling, the solution was added concurrently with the 3,3'-dichlorobenzidine tetrazo solution or the solution was added to the 3,3'-dichlorobenzidine tetrazo solution and the combined solutions added to the acetoacetanilide. For adding the p-sulfo-acetoacetanilide solution after coupling the acetoacetanilide, the solution was added alone or in a 1:1 molar ratio with acetoacetanilide. Each of these sulfonated yellow slurries was treated with a slight (10 mole percent) excess of didecyldimethyl ammonium chloride, then filtered and washed. The resulting presscakes were bench-flushed as described in Example 1: each presscake broke out water in 30-60 seconds and flushed out 30-35% of the water present.

EXAMPLE 3

The coupling procedure of Example 1 was followed, except that the tetrazo solution contained 2 mole percent 2,2'-disulfobenzidine and the acetoacetanilide slurry contained no p-sulfo-acetoacetanilide. The sulfonated yellow slurry was split into two parts; one part was treated with a slight (10 mole percent) excess of didecyl dimethyl ammonium chloride. Both slurries were filtered and washed; the resulting presscakes were bench-flushed as described in Example 1. Both the untreated and treated presscakes broke out water after 30-60 seconds; however, the treated presscake flushed out more (65% vs. 53%) of the water present.

EXAMPLE 4

A 700 gram batch of AAA diarylide yellow pigment composition made with one mole percent of p-sulfoacetoacetanilide and a slight stoichiometric excess of didecyldimethyl ammonium chloride in accordance with the procedure of Example 1, gave a presscake that was easily flushed in a rosin-modified resin and oil vehicle to give a flushed base that was 20% stronger, much more transparent and only slightly more viscous than that from a conventional AAA diarylide yellow pigment.

EXAMPLE 5

A yellow heat set offset ink was manufactured from the flushed base of Example 4 by dispersing the following components with a slow-speed mixer:
30 parts of the flushed base of Example 4
55 parts of a gelled rosin-modified phenolic resin/hydrocarbon resin/alkyd vehicle such as Lawter LoCal HG-1 TM or Varchem 785-33 TM
3 parts bodied linseed oil
1 part polyethylene wax
½ part antioxidant
½ aliphatic ink oil such as Magie 470 TM A rollout was done on coated paper stock using conventional proofer. The printing ink containing the flushed base of Example 4 had higher color strength and was more transparent than a similar printing ink containing a conventional AAA yellow pigment.

The diarylide yellow pigment compositions of this invention exhibit superior color strength and transparency when flushed into bases and incorporated into printing inks. The pigments are, surprisingly and unexpectedly, easily flushable which is defined to mean easily incorporated into flushed bases using conventional flushing techniques. Water is easily "broken-out" of the flushed bases, and the flushed bases of this invention have low viscosities and are easily workable. It is surprising and unexpected that the treatment of sulfonated diarylide yellow pigment compositions with the quaternary ammonium surfactants of this invention would cause the pigment compositions to become hydrophobic and thereby result in enhanced and unexpected flushability.

In addition, since the diarylide pigments of this invention are easily flushed, the process is highly efficient since little or no pigment remains in the separated water phase.

The flushed bases containing the diarylide yellow pigment compositions of this invention are easily incorporated into printing inks and produce inks exhibiting high color strength and transparency. Printing inks containing the diarylide yellow pigment compositions of this invention have high color strength and high transparency.

Although this invention has been shown and described with respect to detailed embodiments thereof, it will be understood by those skilled in the art that various changes in form and detail thereof may be made without departing from the spirit and scope of the claimed invention.

I claim:
1. In an aqueous diarylide yellow pigment composition comprising the sulfonated coupling product of:

(A) The tetrazo salt of 3,3'-dichlorobenzidine, optionally in admixture with the tetrazo salt of 2,2'-disulfobenzidine, and (B) An acetoacetarylide, optionally in admixture with p-sulfo-acetoacetanilide, the improvement comprising the inclusion of a quaternary ammonium salt selected from the group consisting of di cotyl di methyl, tri octyl methyl, di decyl di methyl, coco benzyl dimethyl, dicoco dimethyl, di soya dimethyl, di H tallow dimethyl, tallow trimethyl/dicoco dimethyl, octadecyl benzyl dimethyl, dodecyl pyridinium, hexadecyl pyridinium, quaternary ammonium salts and dicoco amine/acetic acid and dicoco methyl amine/acetic acid ammonium salts, thereby producing a sulfonated diarylide yellow pigment composition having easy flushability, high transparency and high color strength.

2. The pigment composition of claim 1 wherein the tetrazo salt of 3,3'-dichlorobenzidine is admixed with the tetrazo salt of 2,2'-disulfobenzidine.

3. The pigment composition of claim 1 wherein the acetoacetarylide is admixed with p-sulfo-acetoacetanilide.

4. The pigment composition of claim 1 wherein the tetrazo salt of 3,3'-dichlorobenzidine is admixed with the tetrazo salt of 2,2'-disulfobenzidine and the acetoacetarylide is admixed with p-sulfo-acetoacetanilide.

5. The pigment composition of claim 1 wherein the acetoacetarylide is acetoacetanilide.

6. In a flushed base comprising a resin and oil vehicle and a diarylide yellow pigment composition, the improvement comprising the diarylide yellow pigment composition of claims 1, 2, 3, 4, or 5.

7. In an oil-based printing ink comprising an aliphatic oil; a resin-oil vehicle; and, a diarylide yellow pigment composition, the improvement comprising the diarylide yellow pigment composition of claims 1, 2, 3, 4 or 5.

* * * * *